May 2, 1939.   C. H. SCHUH   2,156,308
ART OF MANUFACTURING CEMENT-FIBROUS PRODUCTS
Filed Jan. 26, 1935
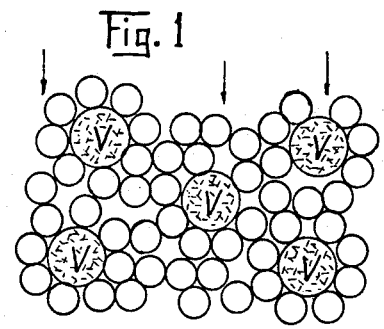
Fig. 1.
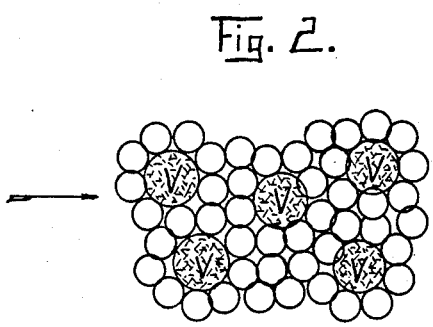
Fig. 2.
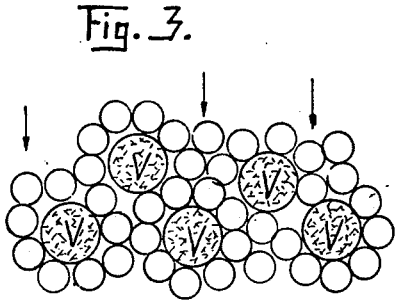
Fig. 3.
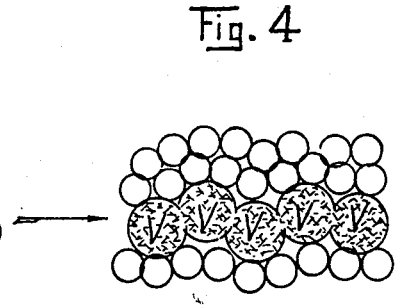
Fig. 4.
Fig. 5.
Fig. 6.
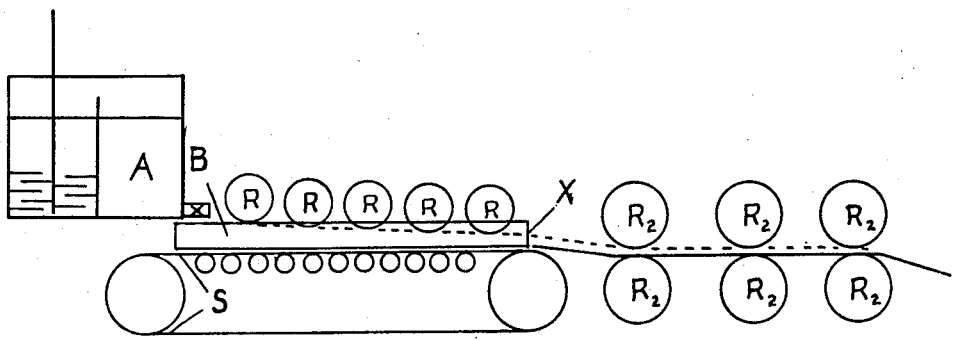
Fig. 7.
INVENTOR
CHARLES H. SCHUH.
BY
ATTORNEY Patented May 2, 1939

2,156,308

UNITED STATES PATENT OFFICE 2,156,308

ART OF MANUFACTURING CEMENT-FIBROUS PRODUCTS

Charles H. Schuh, Ridgewood, N. Y., assignor, by mesne assignments, to Bakelite Building Products Co., Inc., New York, N. Y., a corporation of Delaware Application January 26, 1935, Serial No. 3,578

10 Claims. (Cl. 92—21)

This invention relates to a new method for the production of cement products and to the products resulting therefrom.

Of the many compositions that have been proposed heretofore for various purposes, for example, for general building construction, roofing, wall covering and the like, there have been very few that cover all the requirements and qualifications even to a modest degree. Of the few that might be taken into consideration, there was not one that comes within the sphere of the relatively low cost contemplated therein. All metallic base materials have been obviously too expensive. Organic base materials, such as phenolformaldehyde products, resin products, rubber and wood fibre products, etc., were also too expensive and were not fireproof. Clay and ceramic products have not been considered seriously. Of the available raw materials, Portland cement was perhaps one of the very few that was cheap enough to consider as a base.

Portland cement itself was very unsatisfactory because it was too porous, too brittle and stony, too heavy, too weak, etc. Cement fibre compositions, typified by the asbestos compositions of the trade were unsatisfactory as they were too expensive, too heavy and too hard for many purposes, too coarse grained showing large visible fibres, etc. The introduction of non-fibrous material heretofore has resulted in no marked improvement at low cost. Although various proposals have been made to remedy the shortcomings of the prior art, none, as far as I am aware, has been wholly satisfactory and practical.

An object of the present invention is to obtain cement-fibrous material which is fireproof, waterproof, resistant to wear and to the corrosive effects of weathering, which can be cut with a saw, machined and polished, which has a density and hardness that can be varied according to requirements, and which can be produced at a very low cost.

It is an object of the invention to produce on a mass production scale a cement-fibrous product having great strength, hardness, density and uniformity.

A further object of the invention is to produce continuously a cement-fibrous product having superior qualities by the use of a simplified process and inexpensive equipment.

The present invention contemplates the provision of a practical and economical procedure of a continuous character for accurately molding a panel of cement-fibrous composition having a relatively high density, fine grain, smooth finished surface capable of being polished, possessing waterproof and fireproof qualities and being capable of being machined.

It is also within the contemplation of the invention to provide a continuous process of manufacturing cement-fibrous products having an attractive color effect and surface finish.

Other objects and advantages will become apparent from the following description, taken in conjunction with the accompanying drawing, in which:

Fig. 1 is a diagrammatic view of cement particles arranged in random orientation;

Fig. 2 shows a diagrammatic view of cement particles arranged symmetrically;

Figs. 3 and 4 are schematic views of cement particles located around voids loosely and compactly, respectively;

Fig. 5 illustrates a mass of cement particles and voids loosely arranged with respect to each other;

Fig. 6 shows the mass of cement particles and voids after the application of pressure and the stratification of voids; and Fig. 7 depicts schematically equipment for carrying the present invention into practice.

Generally speaking, the present invention contemplates the provision of a method of producing a cement-fibrous product in which the orientation of the cement particles or crystals in the finished product is in the form of a pattern, herein termed a honeycombed pattern. A supplementary consideration is the effect of the proximity to one another of the cement particles during the time of set, on the production of a definite system of orientation such as a honeycomb pattern, in the final product. To decrease the density of the finished product it is obvious that the cement particles of a given volume must be dispersed into a greater volume. This must be done without the introduction of voids of visible size, as increased porosity is detrimental.

I have found that it is possible to provide a dispersion medium in which the cement particles may be dispersed in various controllable degrees of proximity. Moreover, the dispersion can be maintained in a remarkably uniform condition for a period of time covering the time of set. Furthermore, in this dispersion the particles are oriented in such a manner as to form a pattern with continuous united points of contact of cement particles throughout. The importance of these considerations will become apparent as the description of the process develops.

When cement particles are allowed to settle in air the density obtained is approximately 70 to 100 pounds per cu. ft. The compressibility is considerable. When allowed to settle in water in thin layers, a slightly lower density is obtained. It may be concluded therefore that when the particles just touch in uniform distribution a density of say approximately 60 to 90 lbs. per cu. ft. will be obtained. The range of density is due to the variation in fineness and composition of different samples of cement. In this state the particles will not cement together and the tensile strength may be regarded as zero. A slight compressive action begins to start cementation. For uniform volumetric distribution and cementation of the particles, a density lower than 60 lbs. per cu. ft. would be impossible.

I have found that it is possible to obtain a cement product of a density as low as 30 lbs. per cu. ft. and lower and having an appreciable strength (over 500 lbs. per sq. in. compression) due to cementation. The distribution of cement particles is necessarily different in this case from that obtained by free settling referred to above. I will term the pattern of this latter form of distribution a honeycomb pattern.

In Fig. 1, the small circles designated by the reference character (c) represent cement particles just touching due to free settling. This mass does not cement together effectively. A slight compressive action due to weight or otherwise caused starts cementation illustrated by Fig. 2. The greater the compression the greater the strength of the set product. The density of this product is about at least 60 lbs. per cu. ft. and may be increased to about 120 lbs. per cu. ft. and more with an increase in strength as the density increases.

In Fig. 3, the same notation is used for cement particles and the circles marked V represent voids of greater diameter than that of the cement particles. The particles just touch and no effective cementation results. A slight compressive action due to weight or otherwise caused results in Fig. 4, which will effectively cement the particles together. The greater the compression the greater the strength of the finished product. In this case the density may be lower than 60 lbs. per cu. ft. depending on the size of the voids. By generating gas bubbles in cement during the time of set very light cement products having appreciable strength can be formed. As there is no adhesion between the cement particles and the gas in the voids the strength is due primarily to the adhesion between the cement particles. It is the object of this invention to replace the gas filled voids in this honeycomb pattern with appropriate materials which are very much lighter than the cement particles, thereby reducing the density of the finished product. It is to be noted that there need not necessarily be any adhesion between the cement particles and the incorporated material.

It is preferred in practice to provide a product containing aggregate particles of greater diameter or length preferably than those of the cement particles and of an extremely low density compared to that of the cement particles. These aggregate particles are constituted of material which is relatively cheap and which is distributed throughout the honeycomb pattern of the cement composition.

I have found that various fibrous materials, such as wood, cotton linters, straw, jute, etc., when mechanically pulped to a very fine or gelatinous state can be made to occupy an extremely large volume in aqueous suspension and the material itself in that state will have a density of less than one pound per cu. ft. This makes an excellent material to replace and to fill the voids in Figs. 3 and 4, and to produce new results. For distributing the pulp throughout the cement in the form of small aggregates certain precautions must be taken as will be explained hereinafter.

In carrying the invention into practice, I have found that the natural tendency of finely pulped fibrous material to coagulate can be used to advantage. Thus, I have discovered that when critical quantities of finely pulped wood and cement are intimately mixed together in dilute aqueous suspension which is allowed to settle and coagulate while filtering without seriously disturbing the matrix, the desired new result is obtained. Generally speaking, not more than about 20% by weight of pulp should be used. With greater quantities, there is an increasing tendency for these small aggregate areas of pulp to coalesce in places and cause a sort of stratification in such places, which is detrimental. This result is illustrated in Figs. 5 and 6. For best results this fibrous material should be pulped as fine as possible, the average individual fibre being substantially less than about 1/20 of an inch, and 90% or more cement used, and the aqueous mixture made under considerable dilution, using substantially 90% or more water.

Once the selected matrix is formed after sufficient filtration, it may be compressed to practically any desired degree to obtain a desired strength and density which is required for a given use.

A preferred method of carrying out the invention is as follows: An intimate aqueous mixture comprising approximately 9% of very finely pulped wood and approximately 91% of Portland cement at an approximately 96% dilution is maintained in tank A (see Fig. 7). This mixture is run onto a continuous screen S of approximately 20 mesh. There is a belt B on each side of the screen moving forward with it at about the same speed to prevent the material from running over the sides. The material while filtering passes under a series of rolls R rotating at a peripheral speed equal to the forward movement of the screen. Each roll is set slightly lower than the preceding one and so exerts a slight compressive action. As explained hereinabove, it is essential to have the successive stages of compression exerted by these individual rolls very gradual so as not to disturb the uniform structure of the matrix during the initial stages of filtration. By the time the material reaches the point X on the screen over 90% of the original water has been removed and the material has been compressed to a small fraction of its original volume. It now has sufficient strength to be handled and cut into sheets which are run through a second set of rolls $R_2$ to compress the sheets by gradual stages to the final thickness and density. The sheets are then allowed to harden.

After hardening the sheets may be dipped into an alcoholic dye solution, allowed to dry and the surface is waxed and polished to a beautiful finish.

The finished product may be varied in density from approximately 20 lbs. per cu. ft. to approximately 170 lbs. per cu. ft. For the heaviest material the cement content may be increased to approximately 97% by weight, while for the lightest products it may be reduced with care to about 85% by weight. The more the material is compressed the greater, of course, is the strength and density for any given composition.

Due to its high cement content the product is in all cases fireproof and does not suffer any deterioration when subjected to weather and moisture. Even the light products are without visible voids because such voids as do exist are small and are filled with a matrix of minute fibres. The products which are considerably compressed have a very fine texture and when properly stained look like plastic products. They do not show any trace of the appearance of a fibre product and ordinarily would hardly be recognized as cement products. When stained, there is a tendency to develop a grain effect on the surface of these products giving the appearance of wood or other natural materials which has real and distinctive decorative value.

It is obvious that the same process may be applied to the production of a variety of materials in a variety of ways and I do not wish to limit myself to the particular procedure herein described which is particularly adapted for the production of wall board and the like where continuous volume production is important. One skilled in the art can readily see that a great variety of products can be made by simply filling individual molds provided with areas of filtration and appropriately and carefully compressing the matrix into the mold to the proper density.

It is to be noted that I am fully aware that the general scheme of filtration and compression is not a new one in connection with the production of cement-fibrous compositions and straw board or press board generally. There may be a close similarity of equipment and procedure and even materials used but the process contemplated by the present invention and other processes heretofore used or proposed, nevertheless fundamental differences exist which are evident from the new results obtained by the present invention. Thus, I use less than about 20% of fibrous material whereas processes heretofore proposed use substantially more than 20% by weight. Then again, I use fibrous material which is very finely pulped, individual fibres being about $1/20$ of an inch and less whereas practically all previous processes aim to obtain and use the longest fibres possible, using fibres $1/8$ and sometimes $1/4$ of an inch in length as they rely on the strength obtained by the matting of the individual long fibres. In practically all cases where wood fibre and the like was used, a resinous or other organic binding material was used, which was not necessary in the present case. The cement fibrous composition generally employed asbestos as the fibrous material. In fact, the art paid a large premium for the longest fibre which made the best prior products and the art often used substantially 50% by weight of such fibrous material. When a resinous binder was used often 80% by weight and more of the fibrous material was used. With the use of such large percentages of fibrous material, the amount of pressure required in prior procedures to compress the material into a dense sheet became enormous as the thickness of the sheet was increased.

Accordingly, I wish to state that the principle on which my process is based is in direct contrast to the principle on which prior processes heretofore proposed and used are based.

It is to be observed that other cementitious materials may be used in my process in place of Portland cement, as for example, natural cement, Roman cement, gypsum, magnesite, etc. Likewise, a number of fibrous materials, for instance asbestos fiber, can be used instead of those mentioned hereinabove.

In my co-pending application Serial No. 3,577, filed January 26, 1935, there is described a process for making cement-fibrous compositions of great strength and density by an impact compressive action. This latter process may use the material produced by the process herein described before it has been allowed to set hard so as to effect a still greater compression before hardening takes place.

I claim:

1. The process of making a cement-fibrous structure of high cement content having relatively high strength and uniformity and substantially no lamination of the fiber, which comprises mechanically pulping fibrous material having an average fiber length of less than about $1/20$ of an inch in an aqueous mixture to substantially gelatinous fibrous material having a non-settling volume of the fiber of substantially about one pound per cubic foot and less, dispersing at least about 80 parts by weight of cement particles uniformly through said gelatinous fibrous mixture of at least 90% dilution to not more than about every 20 parts by weight of fiber, dewatering said aqueous mixture to produce a matrix of agglomerated gelatinized fibrous material containing cement particles distributed therein, and compressing the said matrix to desired density to form a product of compressed structure having substantially no lamination of the fiber and capable of setting and curing in the normal manner of a cement product to one having high strength and uniformity.

2. The process of making a cement-fibrous structure of high cement content having relatively high strength and uniformity and substantially no lamination of the fiber, which comprises mechanically pulping fibrous material having an average fiber length of less than about $1/20$ of an inch in an aqueous mixture of at least 90% dilution to substantially gelatinous fibrous material having a non-settling volume of the fiber of substantially about one pound per cubic foot and less, dispersing at least about 90 parts by weight of cement particles substantially uniformly throughout said dilute gelatinous fibrous mixture to not more than about every 10 parts by weight of fiber, dewatering said aqueous mixture to produce a matrix of agglomerated gelatinized fibrous material containing cement particles distributed therein, and compressing the said matrix to desired density to form a product of compressed structure having substantially no lamination of the fiber and capable of setting and curing in the normal manner of a cement product to one having high strength and uniformity.

3. The process of making a cement-fibrous structure of high cement content having relatively high strength and uniformity and substantially no lamination of the fiber, which comprises mechanically pulping fibrous material in an average fiber length of less than about $1/20$ of an inch in an aqueous mixture of at least 90% dilution to a substantially gelatinous fibrous material having a non-settling volume of the fiber of substantially one pound per cubic foot and less, dispersing at least about 85 to 97 parts by weight of cement particles substantially uniformly throughout said dilute gelatinous fibrous mixture to not more than about 15 to about 3 parts by weight of fiber, dewatering said aqueous mixture to produce a matrix of agglomerated gelatinized fibrous material containing cement particles distributed therein, and compressing the said matrix to desired density to form a product of compressed structure having substantially no lamination of the fiber and capable of setting and curing in the normal manner of a cement product to one having high strength and uniformity.

4. The process of making a cement-fibrous structure of high cement content having relatively high strength and uniformity and substantially no lamination of the fiber, which comprises mechanically pulping for an extended period fibrous material having an average fiber length of substantially about $\frac{1}{20}$ of an inch and less in an aqueous suspension to produce gelatinous fibrous material having a non-settling volume of the fiber of substantially about one pound per cubic foot and less, intimately mixing with the thus-gelatinized fibrous material cement particles and water in amount at least equal to four times the amount of cement particles to fibrous material (dry weight basis) and at least 90% water based on the total weight of the aqueous mixture, de-watering the thus-formed dilute aqueous suspension containing cement particles dispersed throughout the same, while not interfering with the agglomerating tendency of the gelatinized fibrous material while still above the dilution value of about 90%, to produce a matrix of agglomerated gelatinized fibrous material containing cement particles distributed therein, reducing the volume of the matrix by a compressive action at a rate which is gradual enough to prevent any breaking down of the aforesaid matrix while such reduction is in progress, and continuing said compressive action until a product of the desired density is obtained to form a product of substantially a compressed structure having substantially no lamination of the fiber and capable of setting and curing in the normal manner of a cement product to one having high strength and uniformity.

5. In the process of making a cement-fibrous structure of high cement content having relatively high strength and uniformity and substantially no lamination of the fiber, the improvement which comprises mechanically pulping fibrous material in an aqueous mixture of at least about 90% dilution to a substantially gelatinous condition and to an average fiber length of less than about $\frac{1}{20}$ of an inch, said condition being characterized by the ability of maintaining cement particles in a large non-settling volume, said non-settling volume of the fiber being substantially one pound per cubic foot and less, and subsequently dispersing uniformly throughout said dilute gelatinous fiber mixture at least about 80 parts by weight of cement particles to about every 20 parts by weight of fiber.

6. In the process of making a cement-fibrous structure of high cement content having relatively high strength and uniformity and substantially no lamination of the fiber, the improvement which comprises mechanically pulping fibrous material in an aqueous mixture of at least 90% dilution to a substantially gelatinous condition and to a non-settling volume of the fiber of less than one pound per cubic foot, dispersing uniformly throughout said dilute gelatinous fiber mixture at least 80 parts by weight of cement particles to about every 20 parts by weight of fiber, and forming cement-fiber product therewith having in its compressed state substantially no lamination of the fiber and capable of setting and curing in the normal manner of a cement product to one having high strength and uniformity.

7. The process of making products comprising a cement-fiber structure having substantial strength and uniformity and containing cement in excess of weight of the fiber portion thereof, which comprises mechanically pulping the fiber in a dilute aqueous mixture to an average fiber length of less than about $\frac{1}{20}$ of an inch and to a condition characterized by the ability to perform the function of maintaining cement particles in a large non-settling volume, said fiber in said condition having a non-settling volume of fiber of about one pound per cubic foot and less, dispersing the cement particles uniformly throughout the dilute conditioned fiber mixture, and forming products comprising said cement-fiber structure therewith.

8. The process of making products comprising a cement-fiber structure having substantial strength and uniformity and containing cement in excess by weight of the fiber portion thereof, which comprises mechanically pulping the fiber in a dilute aqueous mixture to substantially gelatinous fibrous material characterized by the ability to perform the function of maintaining cement particles in a large non-settling volume of the fiber, dispersing the cement particles uniformly through the dilute conditioned fiber mixture, and forming products comprising said cement-fiber structure therewith.

9. The process of making products comprising a cement-fiber structure having substantial strength and uniformity and containing at least 80 parts by weight of cement to about every 20 parts of fiber, which comprises mechanically pulping cellulosic fiber in dilute aqueous mixture to substantially gelatinous fiber material having a non-settling volume of fiber of about one pound per cubic foot and less, dispersing cement particles from the group consisting of Portland cement, natural cement, Roman cement, gypsum and magnesite substantially uniformly through the dilute gelatinous mixture, dewatering the cement fiber mixture thus conditioned to cause settling and coagulating thereof and to form a dispersion of large non-settling volume characterized by orientation of the cement particles relative to the fiber in a substantially homogeneous pattern, further condensing the settled volume without breaking down the characteristic pattern, and forming cement products comprising said cement fiber structure and having a predetermined density.

10. The process of making products comprising a cement-fiber structure having substantial strength and uniformity and containing at least 80 parts by weight of cement to about every 20 parts of fiber, which comprises mechanically pulping asbestos fiber in a dilute aqueous mixture to substantially gelatinous fiber material having a non-settling volume of fiber of about one pound per cubic foot and less, dispersing hydraulic cement particles substantially uniformly through the dilute gelatinous fibrous mixture, dewatering the cement fiber mixture thus conditioned to cause settling and coagulating thereof and to form a dispersion of large non-settling volume characterized by orientation of the hydraulic cement particles relative to the fiber in a substantially homogeneous pattern, further condensing the settled volume without breaking down the characteristic pattern, and forming hydraulic cement products comprising said cement-fiber structure and having predetermined density.

CHARLES H. SCHUH.